United States Patent
Kim et al.

(10) Patent No.: US 11,679,934 B2
(45) Date of Patent: Jun. 20, 2023

(54) TRANSPORTING ROBOT AND METHOD FOR OPERATING THE SAME

(71) Applicant: LG ELECTRONICS INC., Seoul (KR)

(72) Inventors: Sung Jin Kim, Seoul (KR); Sang Hak Lee, Gyeonggi-do (KR); Nak Yeong Kim, Seoul (KR); Sungmin Moon, Seoul (KR); Da Eun Kim, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 408 days.

(21) Appl. No.: 16/903,842

(22) Filed: Jun. 17, 2020

(65) Prior Publication Data

US 2021/0188550 A1 Jun. 24, 2021

(30) Foreign Application Priority Data

Dec. 23, 2019 (KR) .......................... 10-2019-0173230

(51) Int. Cl.
| | | |
|---|---|---|
| *B65G 1/137* | (2006.01) | |
| *G06Q 10/083* | (2023.01) | |
| *G06N 3/08* | (2023.01) | |
| *B65G 1/04* | (2006.01) | |

(52) U.S. Cl.
CPC ........... *B65G 1/137* (2013.01); *B65G 1/0464* (2013.01); *G06N 3/08* (2013.01); *G06Q 10/083* (2013.01)

(58) Field of Classification Search
CPC .............................. B65G 1/137; B65G 1/0464
See application file for complete search history.

(56) References Cited

U.S. PATENT DOCUMENTS

| | | | | |
|---|---|---|---|---|
| 9,745,130 | B1 * | 8/2017 | Rawal | G06Q 10/0875 |
| 10,227,791 | B2 * | 3/2019 | Lindeman | E04H 15/34 |
| 2008/0015745 | A1 * | 1/2008 | Gaegauf | G01S 13/931 701/19 |
| 2015/0375812 | A1 * | 12/2015 | Bernini | B62D 55/06 180/9.1 |
| 2018/0065808 | A1 * | 3/2018 | James | G06Q 10/08 |
| 2018/0154400 | A1 * | 6/2018 | Jain | B07C 5/38 |
| 2018/0186531 | A1 * | 7/2018 | McBride | B65D 55/14 |
| 2018/0213670 | A1 * | 7/2018 | Freire | H05K 7/1492 |
| 2019/0111955 | A1 * | 4/2019 | Canoso | E05F 15/73 |
| 2019/0217477 | A1 * | 7/2019 | Paepcke | G05B 19/4189 |
| 2019/0387945 | A1 * | 12/2019 | Kim | A47L 9/2852 |
| 2020/0039089 | A1 * | 2/2020 | Lee | B25J 18/00 |
| 2020/0339354 | A1 * | 10/2020 | Soto Arriaza | B65G 1/1375 |
| 2021/0061566 | A1 * | 3/2021 | Cacioppo | B25J 9/162 |
| 2021/0188550 | A1 * | 6/2021 | Kim | G06Q 10/083 |
| 2021/0307550 | A1 * | 10/2021 | Wu | A47G 29/22 |
| 2021/0403065 | A1 * | 12/2021 | Sa | B62B 5/0059 |
| 2022/0080578 | A1 * | 3/2022 | Loinger | B25J 19/0075 |

FOREIGN PATENT DOCUMENTS

KR 10-2018-0050875 5/2018

* cited by examiner

*Primary Examiner* — Kyle O Logan
(74) *Attorney, Agent, or Firm* — KED & Associates LLP

(57) ABSTRACT

A transport robot is disclosed. The transport robot may include a cover driver, a power supply, and a processor. The transport robot may execute an artificial intelligence (AI) algorithm and/or a machine learning algorithm, and may communicate with other electronic devices in a 5G communication environment. As a result, user convenience may be improved.

16 Claims, 10 Drawing Sheets

TRANSPORTING ROBOT AND METHOD FOR OPERATING THE SAME

CROSS-REFERENCE TO RELATED APPLICATION

Pursuant to 35 U.S.C. § 119(a), this application claims the benefit of an earlier filing date of and the right of priority to Korean Application No. 10-2019-0173230, filed in Korea on Dec. 23, 2019, the contents of which are incorporated by reference herein in their entirety.

BACKGROUND

1. Field

The present disclosure relates to a robot for transporting one or more articles to a destination and a method of operating the same.

2. Background

The competition for article transport in online and offline markets is getting fiercer day by day, and services are provided for transporting articles purchased on the same day to a destination to provide better user convenience. These days, research on unmanned vehicles for transporting articles is being actively conducted, and regulations related thereto are being created.

Disclosed in related art is a conventional cover for a cargo compartment, which is disposed on a cargo compartment and is configured to slide horizontally so as to be expanded and contracted. Also disclosed is a conventional cover configured to prevent an article loaded in a cargo compartment from falling or being exposed to the outside.

However, such related art may enable transportation of articles to a destination while preventing exposure of the articles from a cargo compartment, but do not disclose a configuration in which the space in a cargo compartment is partitioned such that articles to be transported are loaded in respective partitioned sections.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
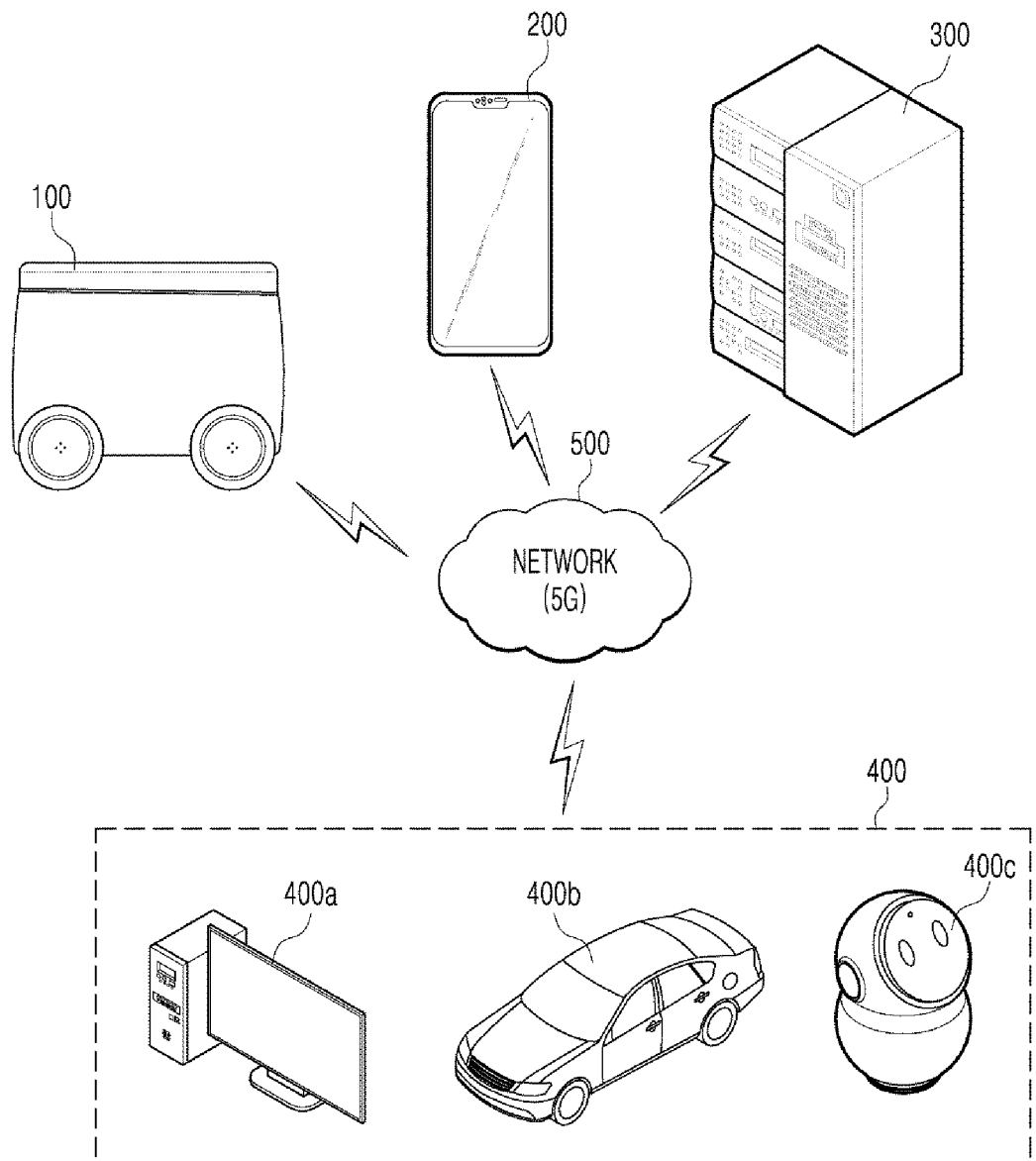
FIG. 1 is a view showing a 5G network-based cloud system according to an embodiment of the present disclosure.

Various embodiments of the present disclosure may utilize techniques relating to artificial intelligence. Artificial intelligence will be generally described below.

Artificial intelligence (AI) refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. An ANN may be defined by a connection pattern between neurons on different layers, a learning process for updating model parameters, and an activation function for generating an output value.

An ANN may include an input layer, an output layer, and may selectively include one or more hidden layers. Each layer may include one or more neurons, and the ANN may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an ANN.

Machine learning may be classified into supervised learning, unsupervised learning, and reinforcement learning depending on the learning method. Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an ANN using training data that has not been given a label. Reinforcement learning may refer to a learning method for training an agent defined within an environment to select an action or an action order for maximizing cumulative rewards in each state.

Machine learning of an ANN implemented as a deep neural network (DNN) including a plurality of hidden layers may be referred to as deep learning, and the deep learning may be one machine learning technique. Hereinafter, the meaning of machine learning may include deep learning.

Reference will now be made in detail to embodiments of the present disclosure, examples of which are illustrated in the accompanying drawings. In relation to describing the present disclosure, when the detailed description of the relevant known technology is determined to unnecessarily obscure the gist of the present disclosure, the detailed description may be omitted.

FIG. 1 is a view illustrating a 5G network-based cloud system according to one embodiment of the present disclosure. The cloud system 1000 may include a transport robot 100, a mobile terminal 200, a robot control system 300, various devices 400, and a 5G network 500.

The transport robot 100 is a robot for transporting an article from a point of departure to a destination. The transport robot 100 may move directly from a warehouse to the destination, and may be loaded in a vehicle and move from the warehouse to the vicinity of the destination of the article, and then disembark in the vicinity of the destination and move to the destination.

The transport robot 100 may also move the article to the destination not only outdoors but also indoors as well. The transport robot 100 may be implemented as an automated guided vehicle (AGV), and the AGV may be a transport device that is moved by, for example, a sensor, a magnetic field, or a non-electrical device on the bottom surface.

The transport robot 100 may include a storage area for storing an article. The storage area may be partitioned to load various kinds of articles therein. Various kinds of articles may be placed in a plurality of the partitioned unit storage areas. Accordingly, it is possible to prevent the articles from being jumbled.

The mobile terminal 200 may communicate with the transport robot 100 over the 5G network 500. The mobile terminal 200 may be a device that is carried by a user who installs partitions in the storage area in order to load articles therein, or may be a device that is carried by a recipient of a loaded article. The mobile terminal 200 may provide information based on an image. The mobile terminal 200 may include mobile devices such as a mobile phone, a smartphone, and a wearable device, for example, a smart watch, smart glasses, and a head mounted display (HMD).

The robot control system 300 may remotely control the transport robot 100 and may respond to various requests of the transport robot 100. For example, the robot control system 300 may perform calculations using artificial intelligence in response to a request of the transport robot 100.

In addition, the robot control system 300 may set a movement route of the transport robot 100. In the case in which a plurality of destinations is present, the robot control system 300 may set a movement order in which the transport robot 100 is to visit the destinations.

The various devices 400 may include, for example, a personal computer (PC) 400*a*, an autonomous vehicle 400*b*, and a home robot 400*c*. When the transport robot 100 arrives at the transport destination of the article, the transport robot 100 may deliver the article directly to the home robot 400*c* through the communication with the home robot 400*c*.

The various devices 400 may be connected to, for example, the transport robot 100, the mobile terminal 200, and the robot control system 300 through the 5G network 500 in a wired or wireless manner. The transport robot 100, the mobile terminal 200, the robot control system 300 and the various devices 400 are all equipped with a 5G module capable of transmitting and receiving data at a rate of 100 Mbps to 20 Gbps (or higher), so that a large capacity video files may be transmitted to various devices. In addition, the robot 100, the mobile terminal 200, the robot control system 300, and the various devices 400 may be operated at a low power to minimize power consumption. However, the transmission rate may be implemented differently according to an embodiment.

The 5G network 500 may include, for example, a 5G mobile communication network, a local area network, and the Internet, and provide a communication environment to devices in a wired or wireless manner.

Figure 2:
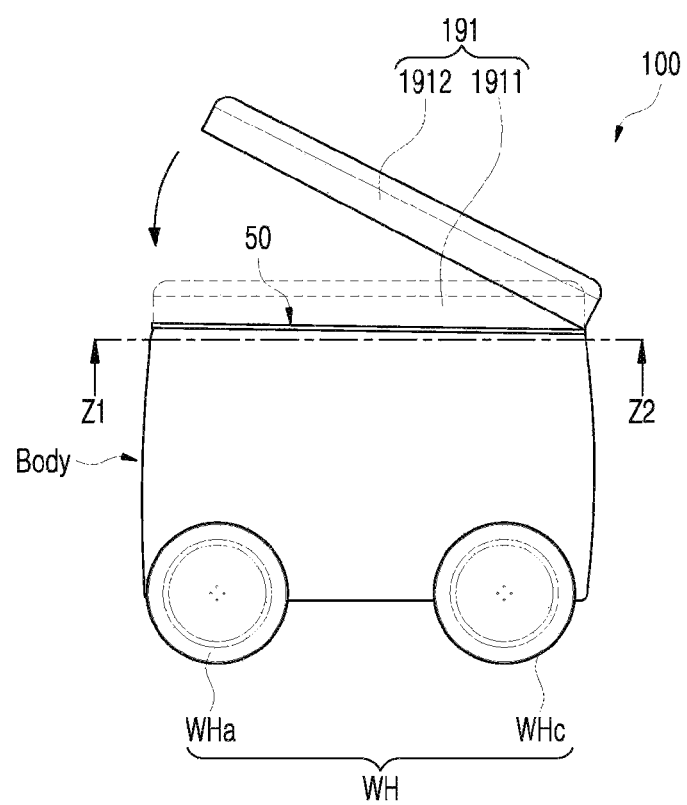
FIG. 2 is a view schematically showing the exterior of a transport robot according to an embodiment of the present disclosure.

FIG. 2 is a view schematically showing the exterior of the transport robot 100 according to an embodiment of the present disclosure. The transport robot 100 may include a body. The body may include a storage area SA for storing articles. The transport robot 100 may move using a plurality of wheels WH (WHa and WHc) disposed at the bottom of the body. In an alternative embodiment, in which the transport robot 100 is configured to be capable of flight, the wheels WH may be eliminated from the configuration of the transport robot.

The transport robot 100 may include a protection structure 191, which is disposed on the body in order to protect all of the storage area 50. The protection structure 191 may be configured to rotate about a portion thereof that is coupled to the body so as to open and close the storage area 50. For example, when the protection structure 191 is located at a first position 1911, the storage area 50 may be closed, and when the protection structure 191 is located at a second position 1912, the storage area 50 may be open. The protection structure 191 and the body may be opened or closed by a locking device.

In an alternative embodiment, the protection structure 191 may be coupled to the body so as to open the storage area through sliding movement. The transport robot 100 may also be implemented without the protection structure 191.

In an alternative embodiment, a device for authenticating a user may be separately provided in a predetermined region on the protection structure 191.

Figure 3:
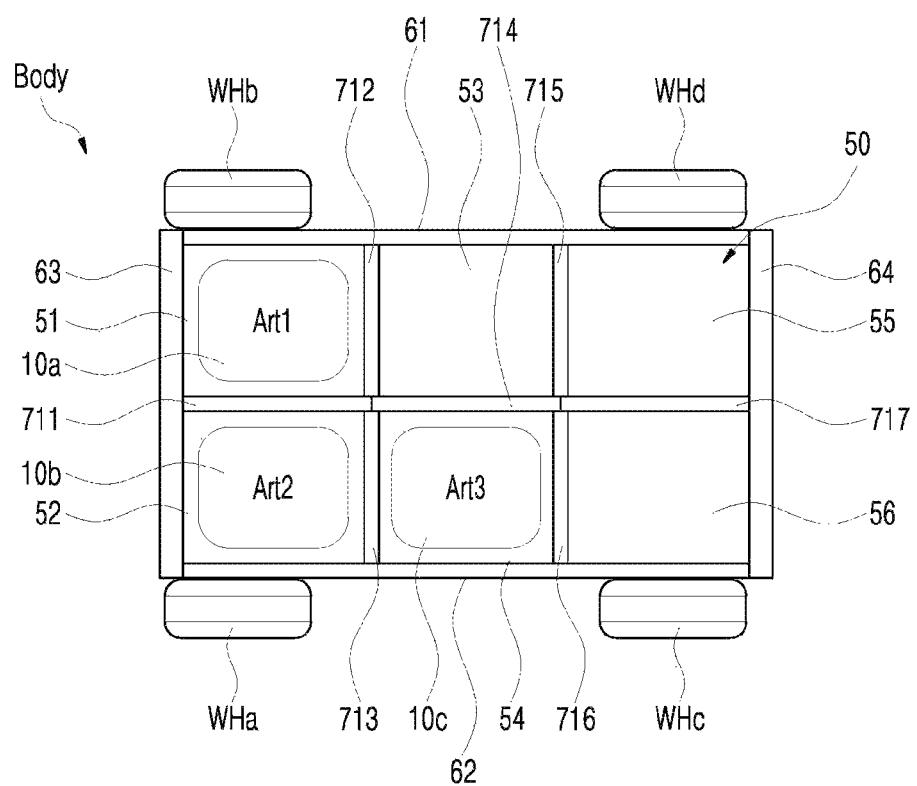
FIGS. 3 and 4 are plan views of the transport robot when viewed from above with respect to the cross-section in FIG. 2.
Figure 4:
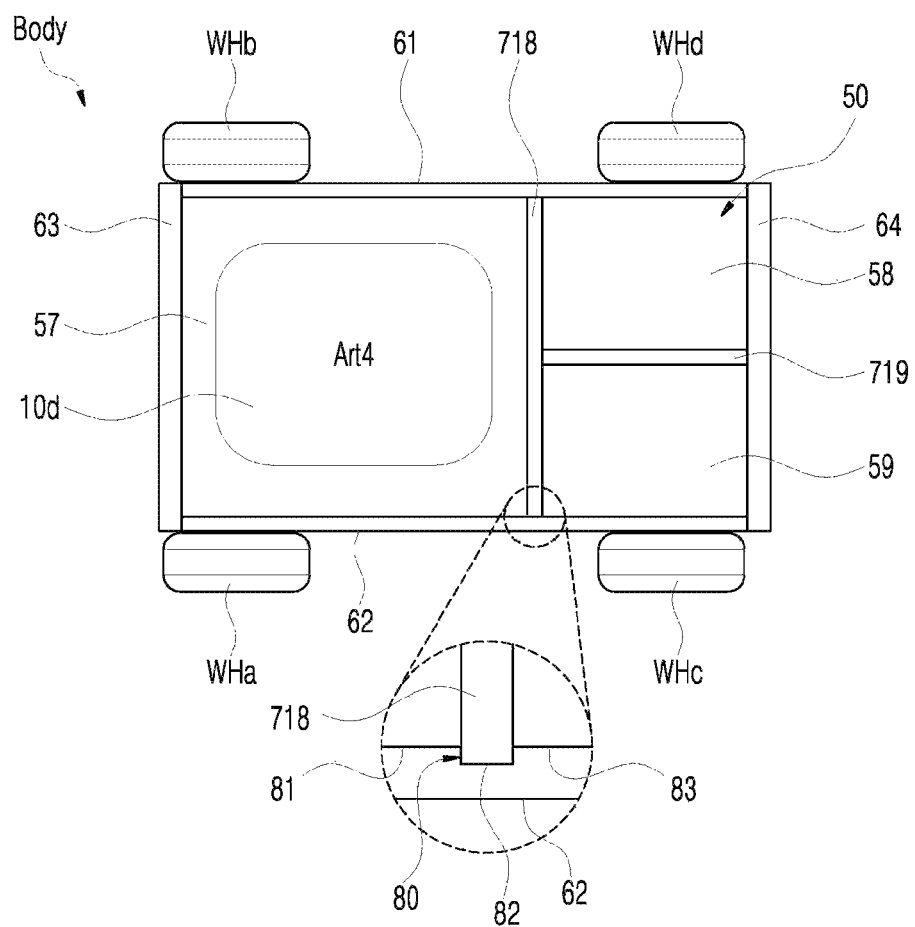

FIGS. 3 and 4 are plan views of the transport robot 100 when viewed from above with respect to cross-section Z1-Z2 in FIG. 2. As shown in FIGS. 3 and 4, the storage area 50 may be partitioned differently depending on the situation.

Referring to FIG. 3, the body may include a plurality of side walls 61 to 64, and the storage area 50, in which an article is loaded, may be disposed in the space defined by the plurality of side walls 61 to 64. The storage area 50 may be divided into a plurality of unit storage areas 51 to 56. The storage area 50 may be divided by a plurality of partitions 711 to 717. Here, the number of unit storage areas 51 to 56 may vary depending on the arrangement of the partitions. The partitions 711 to 717 shown in FIG. 3 may have the same size as each other, and various kinds of articles 10*a* to 10*c* may be stored in the unit storage areas 51 to 56 which have been partitioned.

Here, the plurality of partitions 711 to 717 may be manually disposed in the storage area 50. In an alternative embodiment, the transport robot 100 may place the partitions in the storage area 50 using a robot arm (not shown). In another alternative embodiment, the transport robot 100 may include a rail disposed at the lower portion of the storage area 50, and on which the partitions are capable of automatically moving. The rail may move the partitions to division points in the storage area 50.

The transport robot 100 may manage the plurality of unit storage areas 51 to 56 in rows and columns. For example, the transport robot 100 may set one or more unit storage areas 51, 53 and 55 as a first row, and may set one or more unit storage areas 52, 54 and 56 as a second row. In addition, the transport robot 100 may set the first unit storage area 51 and the second unit storage area 52 as the first column, the third unit storage area 53 and the fourth unit storage area 54 as the second column, the fifth unit storage area 55 and the sixth unit storage area 56 as the third column.

Here, the transport robot 100 may set the security level of an article loaded in the first column to be lower than the security level of an article loaded in the second column, and may set the security level of an article loaded in the second column to be lower than the security level of an article loaded in the third column.

According to the embodiment, the arrangement of the rows and the columns may differ, and the storage area 50 may be formed in a multi-layer structure. In an alternative embodiment, the transport robot 100 may be implemented such that articles are arbitrarily disposed in the plurality of unit storage areas 51 to 56.

Referring to FIG. 4, the storage area 50 may be divided into a plurality of unit storage areas 57 to 59. The transport robot 100 may set the size (volume) of the first unit storage area 57 to be larger than the size (volume) of any of the second unit storage areas 58 and 59. The sizes of the unit storage areas may be set based on information on the size of an article 10*d* to be loaded. The first partition 718 and the second partition 719 may have different sizes from each other. To this end, the transport robot 100 may collect information in advance about the volume of the article 10*d* to be loaded therein.

The body may have grooves formed in portions thereof to which the partitions are coupled. For example, the body may include a groove 80 (81 to 83) formed in the inner surface of the second side wall 62 such that the first partition 718 may be coupled therein. A sensor for detecting engagement of the first partition 718 may be disposed in the groove 80. In an alternative embodiment, the body may have a structure, such as the groove 80, formed in the side surface or the bottom of the storage area 50 such that the partition may be coupled therein. The corresponding structure may be provided with a sensor for detecting engagement of the partition. The sensor for detecting engagement of the partition with the storage area 50 may include, for example, a proximity sensor, a magnet sensor, and an infrared sensor.

While a cover for covering or exposing the storage area 50 is not illustrated in FIGS. 3 and 4, the embodiment will be described below in more detail with reference to FIGS. 5 and 6, in which a cover is illustrated.

Figure 5:
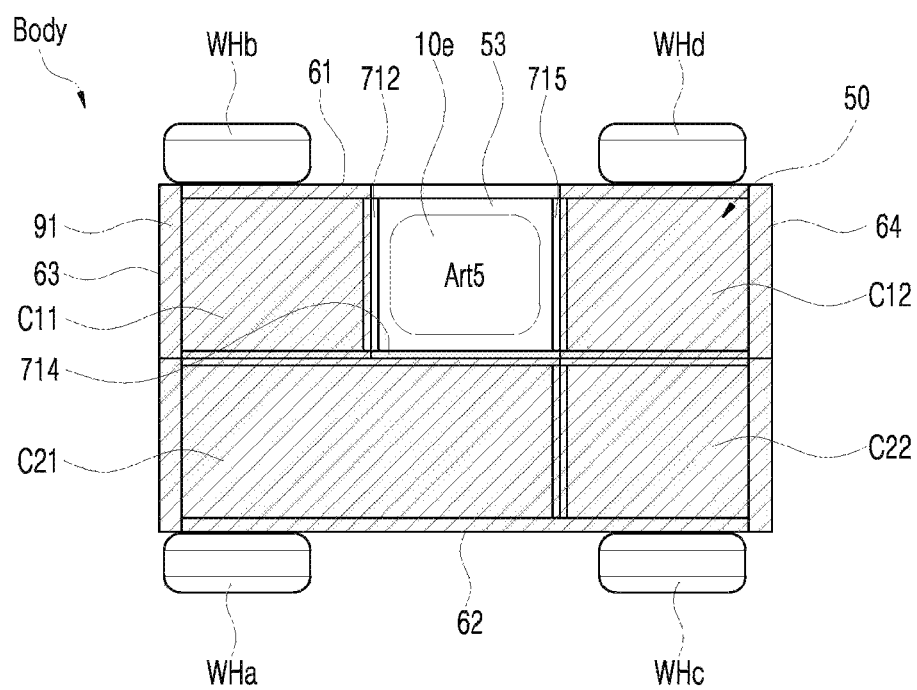
FIGS. 5 and 6 are views for explaining the configuration for driving a cover to cover or expose an article loaded in a storage area according to an embodiment of the present disclosure.
Figure 6:
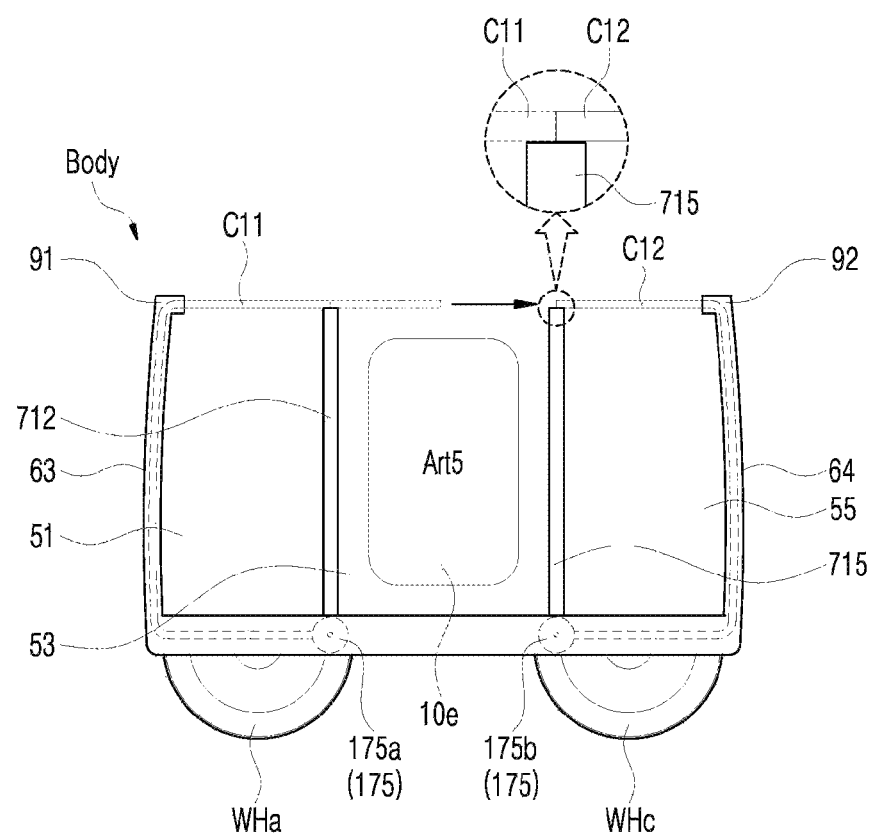

FIGS. 5 and 6 are views for explaining the configuration for driving the cover to cover or expose an article loaded in the storage area 50 according to an embodiment of the present disclosure. FIG. 5 is a plan view of the transport robot 100 according to an embodiment of the present disclosure when viewed from above, and FIG. 6 is a side cross-sectional view of the transport robot 100. The embodiment will be described below in more detail with reference to FIGS. 5 and 6 on the assumption that the partitions 711 to 717 shown in FIG. 3 are provided. Reference numerals in FIG. 7 will be also be referenced.

Figure 8:
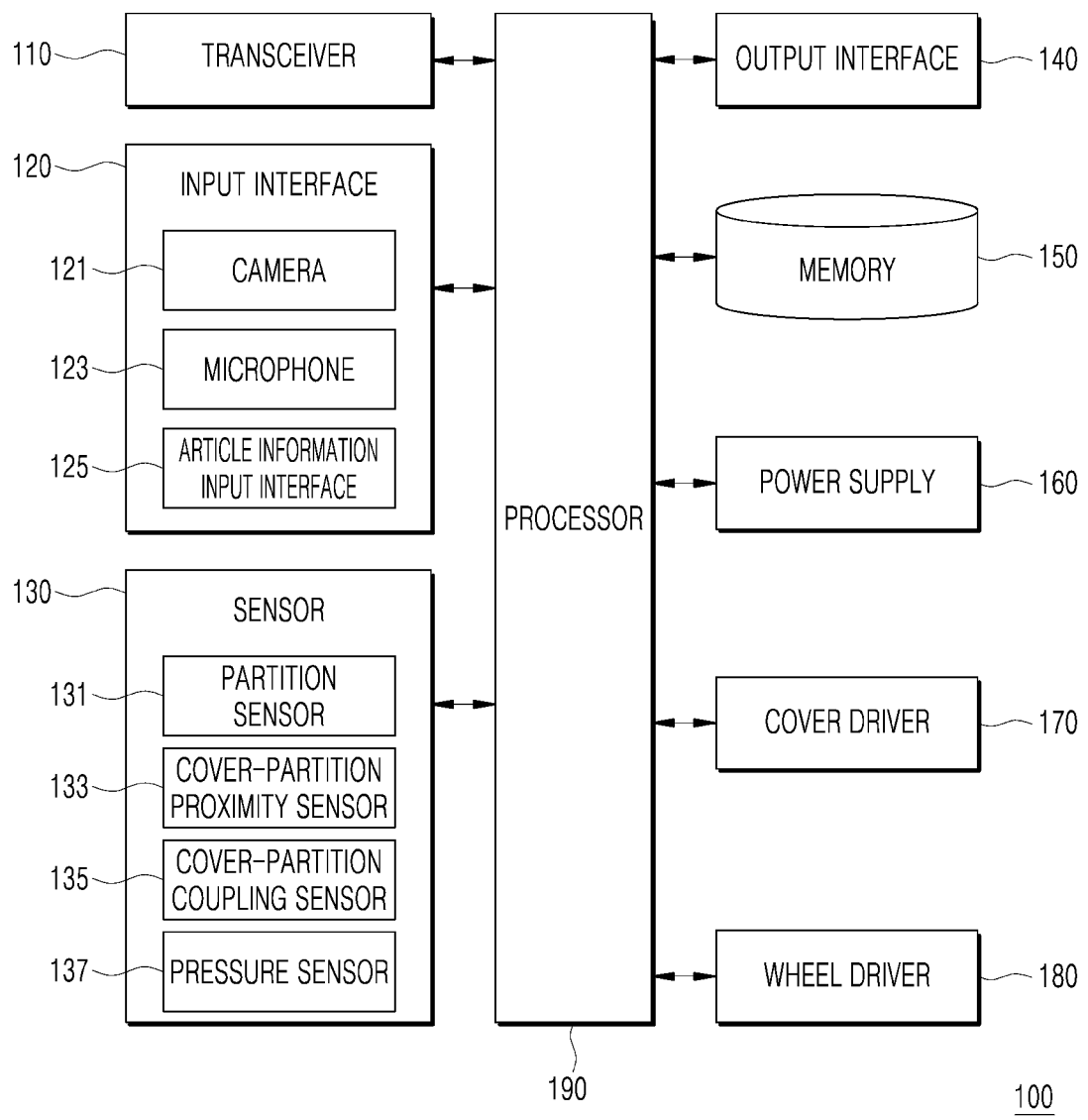
FIG. 8 is a block diagram for explaining the configuration of the transport robot according to an embodiment of the present disclosure.

The transport robot 100 may drive one or more covers C11, C12, C21 and C22 configured to manage the respective unit storage areas 51 to 56 using a cover driver 170 (refer to FIG. 8).

Each of the covers C11, C12, C21 and C22 may be formed of a flexible material so as to be wound on or unwound from the rollers 175 (175*a* and 175*b*). When the covers cover or expose the storage area 50, they may be tensioned linearly. The transport robot 100 may include one or more linear movement guides 91 and 92 to allow the covers C11, C12, C21 and C22 to move linearly when externally exposed from the body. In an alternative embodiment, each of the covers C11, C12, C21 and C22 may be formed of an inflexible material such that inflexible pieces thereof are linked to each other in a chain arrangement.

In an alternative embodiment, each of the covers may be formed such that a plurality of plates with a predetermined width are coupled to each other. The plates may be coupled to each other in a hinge engagement manner or in a chain engagement manner. Accordingly, the covers may be folded when moving into the side walls 63 and 64, and may move in a horizontal direction in the region in which the covers are exposed.

For example, the covers C11 and C12 disposed in the first row may pass into the third side wall 63 and the fourth side wall 64 and may move to the lower surface of the body. The rollers 175 (175*a* and 175*b*) may be disposed on the lower surface of the body such that the covers C11 and C12 may be wound thereon or unwound therefrom. The rollers 175 (175*a* and 175*b*) may be located at different positions from each other.

Each of the covers C11, C12, C21 and C22 may be coupled to the partitions. For example, the first cover C11 may be coupled to the second partition 712 and the fifth partition 715. In addition, the second cover C12 may also be coupled to the fifth partition 715 and the second partition 712. However, the first cover C11 and the second cover C12 may not overlap each other, but may be simultaneously coupled to the same partition at one point.

Figure 7:
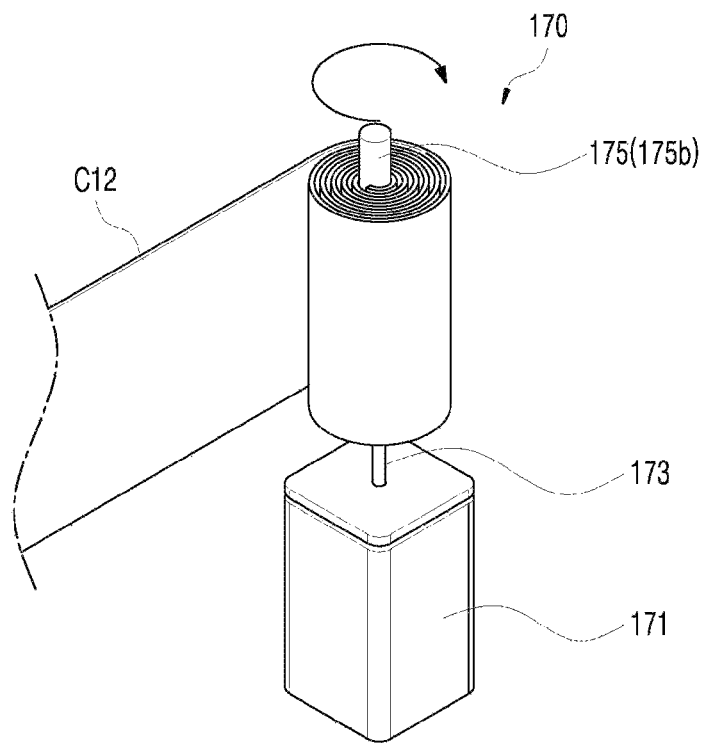
FIG. 7 is a view for explaining a cover driver according to an embodiment of the present disclosure.

FIG. 7 is a view for explaining the cover driver 170 according to an embodiment of the present disclosure. The cover driver 170 will now be described with reference to the second cover C12.

Referring to FIG. 7, the second cover C12 may be wound on or unwound from the roller 175 (175*b*). The roller 175 (175*b*) may be connected to a rotating shaft 173 so as to be rotated by a motor 171. Here, the motor 171 may correspond to the second cover C12, and may be connected to the rotating shaft 173 so as to rotate the roller 175 (175*b*).

According to an embodiment of the present disclosure, The cover driver 170 comprises a plurality of motors to separately correspond to a different one of the covers. The cover driver 170 comprises a plurality of rotating shafts to separately rotate based on a corresponding one of the motors. The cover driver 170 comprises a plurality of rollers to separately wind a corresponding one of the covers on the roller or to separately unwind the corresponding one of the covers from the roller based on rotational movement of the corresponding one of the motors.

FIG. 8 is a block diagram for explaining the configuration of the transport robot 100 according to an embodiment of the present disclosure. The configuration of the transport robot 100 will now be described with reference to FIGS. 3 and 5 to 8.

Referring to FIG. 8, the transport robot 100 may include the body having the storage area 50 included therein, and the components described below may be disposed in the body. The transport robot 100 may include a transceiver 110, an input interface 120, a sensor 130, an output interface 140, a memory 150, a power supply 160, a cover driver 170, a wheel driver 180, and a processor 190. The components shown in FIG. 8 are not essential for implementing the transport robot 100, and thus the transport robot 100 described herein may have more or fewer components than those listed above.

The transceiver 110 may include a wired or wireless communication module capable of communicating with the robot control system 300.

In an alternative embodiment, the transceiver 110 may be equipped with a module for Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, and Near Field Communication (NFC).

The input interface 120 may include a user input interface for receiving information from a user. In an alternative embodiment, the input interface 120 may include a camera 121 from which the input interface 120 receives an image signal and a microphone 123 (hereinafter referred to as "mic") from which the input interface 120 receives an audio signal. Here, the camera 121 or the microphone 123 may be regarded as a sensor, and thus a signal obtained by the camera 121 or the microphone 123 may be referred to as sensing data or sensor information.

The input interface 120 may obtain, for example, learning data for model learning and input data used when output is obtained using a learning model. The input interface 120 may obtain raw input data. In this case, the processor 190 may extract an input feature by preprocessing the input data.

The input interface 120 may include an article information input interface 125. The article information input interface 125 may receive, for example, size information of an article, weight information of an article, destination information, and information about a transport requester. In this case, the article information input interface 125 may include a code reader (not shown).

The sensor 130 may obtain at least one of internal information of the transport robot 100, surrounding environment information of the transport robot 100, or user information by using various sensors.

In this case, the sensor 130 may include, for example, a satellite-based position sensor, a partition sensor 131, a cover-partition proximity sensor 133, a cover-partition coupling sensor 135, and a pressure sensor 137. In addition, the sensor 130 may include, for example, a distance sensor, an illumination sensor, an acceleration sensor, a magnetic sensor, a gyro sensor, an inertial sensor, an RGB sensor, an infrared sensor, a finger scan sensor, an ultrasonic sensor, an optical sensor, a microphone, a light detection and ranging (LiDAR) sensor, a barometer sensor, radar, and a magnet sensor.

The output interface 140 may generate an output such as a visual output, an audible output, or a haptic output. The output interface 140 may include, for example, an optical output interface and a display for outputting visual information, a speaker for outputting auditory information, an ultrasonic output interface for outputting an ultrasonic signal belonging to inaudible frequency, and a haptic module for outputting haptic information.

The memory 150 stores data supporting various functions of the transport robot 100. The memory 150 may store a plurality of application programs or applications running on the transport robot 100, data for the operation of the transport robot 100, and commands for the transport root 100.

In addition, the memory 150 may store information necessary to perform an operation by using artificial intelligence, machine learning, and artificial neural network. The memory 150 may store a deep neural network model. The deep neural network model may be used to infer result values for new input data rather than training data. The inferred value may be used as the basis for the judgment to perform any operation.

The power supply 160 receives power from an external power source or an internal power source, under the control of the processor 190, and supplies power to each of the components in the transport robot 100. The power supply 160 includes a battery which may be a built-in battery or a replaceable battery. The battery may be charged via a wired or wireless charging method, and the wireless charging method may include a magnetic induction method or a magnetic resonance method.

The cover driver 170 may drive the covers C11 to C22 (refer to FIG. 5) such that the covers C11 to C22 (refer to FIG. 5) cover or open the unit storage areas. The cover driver 170 may move one or more covers that cover or open the exposed area that is exposed to the outside of the body among the plurality of unit storage areas SAP1 to SAP6.

The wheel driver 180 may cause the plurality of wheels to move the transport robot 100 including the body.

A leg driver may be provided to cause a plurality of legs to move the body under the control of the processor 190. The plurality of legs may correspond to a structure formed to allow the transport robot 100 to walk or run. Four legs may be provided, but the disclosure is not limited thereto. The plurality of legs may be coupled to the body in an integral form or in a detachable form.

The transport robot 100 may include the wheel driver 180 and/or the leg driver to move the body. However, in the present specification, the transport robot 100 equipped with the wheel driver 170 will be chiefly described.

The processor 190 is a module that controls the components of the transport robot 100. The processor 190 may refer to a data processing apparatus embedded in hardware, which includes circuits that are physically structured to perform functions represented as code or commands present in a program. Examples of the data processing apparatus embedded in hardware may include a microprocessor, a central processing unit (CPU), a processor core, a multiprocessor, an application-specific integrated circuit (ASIC), and a field programmable gate array (FPGA), but the scope of the present disclosure is not limited thereto.

The transport robot 100 may include the storage area 50, and may further include one or more partitions 711 to 717 that divide the storage area 50 into a plurality of unit storage areas 51 to 56.

In an alternative embodiment, the storage area 50 may include not only a plurality of unit storage areas 51 to 56 formed in a single-layer structure but also a plurality of unit storage areas formed in a multi-layer structure.

The transport robot 100 may have grooves 80 (refer to FIG. 4) formed in the portions of the storage area 50 to which the partitions 711 to 717 are coupled. The partition sensor 131 may be disposed in each of the grooves 80.

The partition sensor 131 may be disposed at each of the portions (for example, the inner wall and the lower wall) to which the partitions are coupled, and may directly provide sensing information to the processor 190, or may provide the same to the transceiver 110.

The processor 190 may determine various pieces of information based on information detected at a predetermined position of the storage area 50. Specifically, based on the information detected by the partition sensor 131, the processor 190 may determine at least one of arrangement information of the partitions 711 to 717 coupled to the body, arrangement information of the plurality of unit storage areas 51 to 56, or volume information of the plurality of unit storage areas 51 to 56.

The processor 190 may collect at least one of number information, weight information, size information, delivery order information, or security level information of articles to be loaded in the storage area 50. For example, the processor 190 may collect the above information through the input interface 120. The input of the input interface 120 may include touch input on a display.

Based on the above collected information, the processor 190 may transmit the arrangement information of the partitions 711 to 717 to the mobile terminal 200 (see FIG. 1) through the transceiver 110. The mobile terminal 200 may be a device that is carried by a user who manually holds the partitions and forms a plurality of unit storage areas 51 to 56. The user may install the partitions 711 to 717 in the storage area 50 based on the received arrangement information of the partitions 711 to 717.

The processor 190 may control the cover driver 170 such that the covers C11 to C22 for managing the respective unit storage areas 51 to 56 cover or open the exposed areas among the plurality of unit storage areas 51 to 56.

Each of the covers C11 to C22 may include a cover movement path. Hereinafter, the first cover C11 and the second cover C12 will be described by way of example. The cover movement path may include an outer movement path that is exposed to the outside of the body (when covering or exposing the storage area 50) and an inner movement path disposed inside the body. The inner movement path may be disposed inside the third side wall 63 or the fourth side wall 64, but may also be disposed at various points of the body.

The transport robot 100 may include the linear movement guides 91 and 92. The linear movement guides 91 and 92 may have a structure for allowing the covers C11 and C12, formed of a flexible material, to move linearly along the outer movement path. That is, the covers C11 and C12 may move linearly without becoming crooked. The linear movement guides may be disposed inside the body.

The transport robot 100 may be configured such that the storage area 50 is divided into a plurality of unit storage areas in M rows and N columns (where M is a natural number of 1 or more and N is a natural number greater than 1) and in a single-layer structure by one or more partitions.

Hereinafter, two covers C11 and C12 for managing the unit storage areas 51, 53 and 55 in the first row will be described by way of example with reference to FIG. 5. The two covers C11 and C12 in the first row and the two covers C21 and C22 in the second row may be controlled independently of each other, or may be simultaneously controlled (in the case in which a relatively large article is loaded over the first column of the first row and the first column of the second row).

The first cover C11 may manage the unit storage areas 51 and 53 that are disposed in the direction oriented from the first column (unit storage area 51) to the Nth column (unit storage area 55), and the second cover C12 may manage the unit storage area 55 that is disposed in the direction oriented from the Nth column (unit storage area 55) to the first column (unit storage area 51). The first cover C11 and the second cover C12 may be disposed so as not to overlap each other, and may be simultaneously coupled to the partition 715 or 712 at the intermediate point of the first row (above 715 or 712).

In the case in which the number of unit storage areas is an even number (for example, four), the first cover C11 and the second cover C12 may manage the same number of unit storage areas (two unit storage areas for each cover). In the case in which the number of unit storage areas is an odd number, the first cover C11 may manage one more unit storage area than the second cover C12. However, the disclosure is not limited thereto.

Articles may be loaded in the unit storage areas 51, 53 and 55 such that the security level thereof gradually increases from the left to the right (in the direction from the first column to the Nth column). The reason for this is to coincide with the tendency in which a person is more likely to open covers in a right direction. However, the disclosure is not limited thereto.

In addition, the processor 190 may control the cover driver 170 such that the unit storage area in which the article to be delivered to the closest destination is loaded is opened first among the unit storage areas managed by the first cover C11 and the second cover C12. In addition, in response to articles being loaded in the unit storage areas according to delivery priority, the processor 190 may cause the unit storage area in which an article having the highest delivery priority is loaded to be opened first.

There may occur a case in which, among the plurality of unit storage areas managed by one of the first cover C11 and the second cover C12, the unit storage area in which an article to be delivered to the farthest destination is loaded is opened first.

That is, articles may be loaded in three unit storage areas 51, 53 and 55, and both the first cover C11 and the second cover C12 may be coupled to the fifth partition 715. When the article loaded in the first unit storage area 51 arrives at the destination, the first cover C11 may be opened such that the first unit storage area 51 and the second unit storage area 53 are opened. In order to prevent exposure of the second unit storage area 53, the second cover C12 may be disengaged from the fifth partition 715, and may be coupled to the second partition 712. Accordingly, the article in the second unit storage area 53 may be prevented from being exposed. As such, the first cover C11 and the second cover C12 may move complementary to each other so as to open only the appropriate unit storage area.

The coupling structure of the covers C11 and C12 and the partitions 715 and 712 according to an embodiment of the present disclosure will be described. Both the first cover C11 and the second cover C12 may be coupled to the second partition 712 or to the fifth partition 715. The first and second covers C11 and C12 may include cover coupling portions formed at the portions thereof that are coupled to the partitions 712 and 715, and the partitions 712 and 715 may include partition coupling portions formed at the portions thereof that are coupled to the covers C11 and C12.

Each cover coupling portion may include an electromagnet. The power supply 160 may apply electric power to the electromagnet. Each partition coupling portion may include a material (e.g. Fe) that is magnetically coupled to the electromagnet.

In addition, the cover-partition proximity sensor for detecting the approach of the covers C11 and C12 or the partitions 715 and 712 may be provided in each cover coupling portion or in each partition coupling portion. Two cover-partition proximity sensors may be disposed in each partition coupling portion or in each cover coupling portion so as to detect the approach of each cover or each partition. The cover-partition proximity sensor may be implemented as an infrared sensor or a laser sensor. However, the disclosure is not limited thereto.

Upon detecting the approach of the covers C11 and C12 or the partitions 715 and 712 through the cover-partition proximity sensor, the processor 190 may control the cover coupling portion such that the covers C11 and C12 and the partitions 715 and 712 are coupled to each other by applying power to the electromagnet.

In addition, the processor 190 may cause the cover driver 170 to open a unit storage area corresponding to a specific article based on at least one of security level information, delivery order information, size information, weight information, or characteristic information of articles loaded in the storage area 50. To this end, the processor 190 may store destination information and article information in association with each other.

In addition, the processor 190 may capture an image of an article using the camera 121, and may recognize, based on the captured image of the article, at least one of type information, size information, or characteristic information of the article. The processor 190 may store the recognized information of the article in the memory 150.

In this case, the processor 190 may capture an image of the user using the camera 121, and may control the cover driver 170 based on the captured image information such that the unit storage area, in which loaded is an article to be delivered to the user, is opened. To this end, the processor 190 may store article information and information about the recipient of the article in the memory 150 in association with each other.

Figure 9:
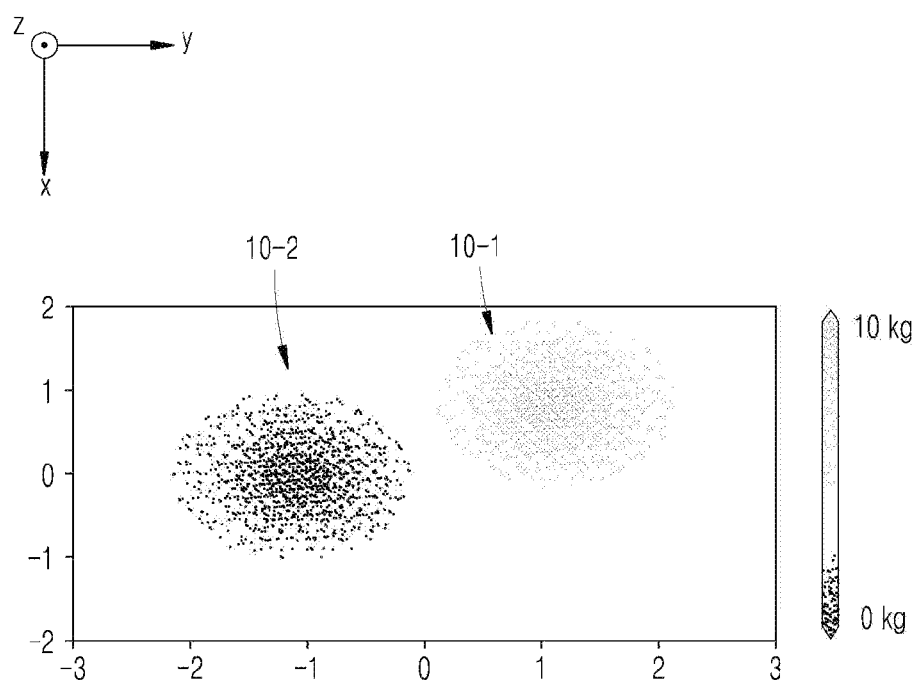
FIG. 9 is a diagram for explaining a method of measuring the weight distribution of the storage area according to an embodiment of the present disclosure.

FIG. 9 is a diagram for explaining a method of measuring the weight distribution of the storage area 50 according to an embodiment of the present disclosure. The processor 190 may measure the weight distribution of the articles 10-1 and 10-2 loaded in the storage area 50. More specifically, the processor 190 may measure the weight distribution of the articles loaded in the storage area 50 using the pressure sensor 137. On the assumption that the point at which the values of the X-axis and the Y-axis are zero is an origin point, the pressure distribution may be measured in all directions with respect to the origin point. Referring to the example shown in FIG. 9, the weight distribution of the first article 10-2 may be wider, and the weight distribution of the second article 10-1 may be narrower. A weight sensing range may be implemented differently according to the pressure sensor performance.

In this case, when a new article is loaded, the processor 190 may collect weight information of the new article, and may measure the pressure distribution of the existing articles using the pressure sensor 137. Based on the information of the measured pressure distribution, the processor 190 may control the cover driver 170 such that the unit storage area corresponding to information of the position at which the new article is to be placed is opened.

Figure 10:
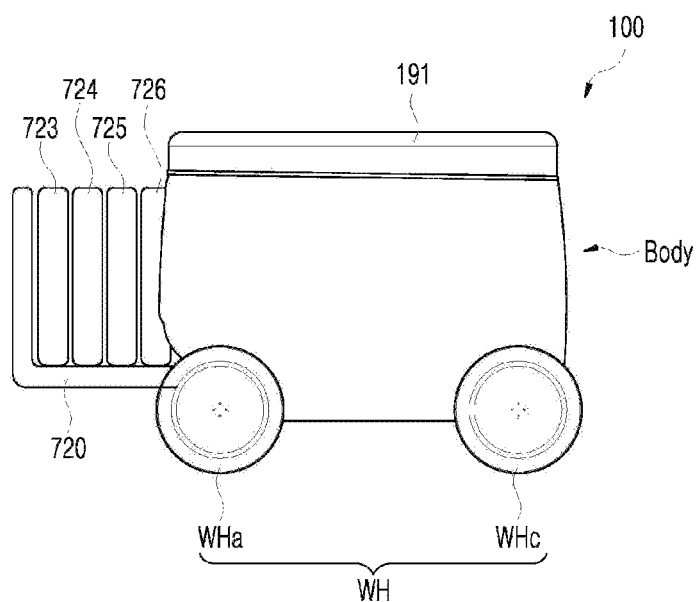
FIG. 10 is a view for explaining a partition storage for storing a plurality of partitions according to an embodiment of the present disclosure.

FIG. 10 is a view for explaining a partition storage 720 for storing a plurality of partitions 723 to 726 according to an embodiment of the present disclosure. The partition storage 720 may be detachably provided in the body, and may store a plurality of partitions 723 to 726. However, the partition storage 720 may be implemented in various forms. For example, the partition storage 720 may be implemented in the form of a drawer.

The transport robot 100 may further include a robot arm for moving the partitions. The robot arm may couple an optimal partition to a corresponding point in the storage area 50. Accordingly, the partitions may be automatically disposed in the storage area 50, rather than being manually disposed in the storage area 50 by the user. Based on number information and volume information of articles to be loaded, the processor 190 may cause the robot arm to place one or more partitions in the storage area 50.

Figure 11:
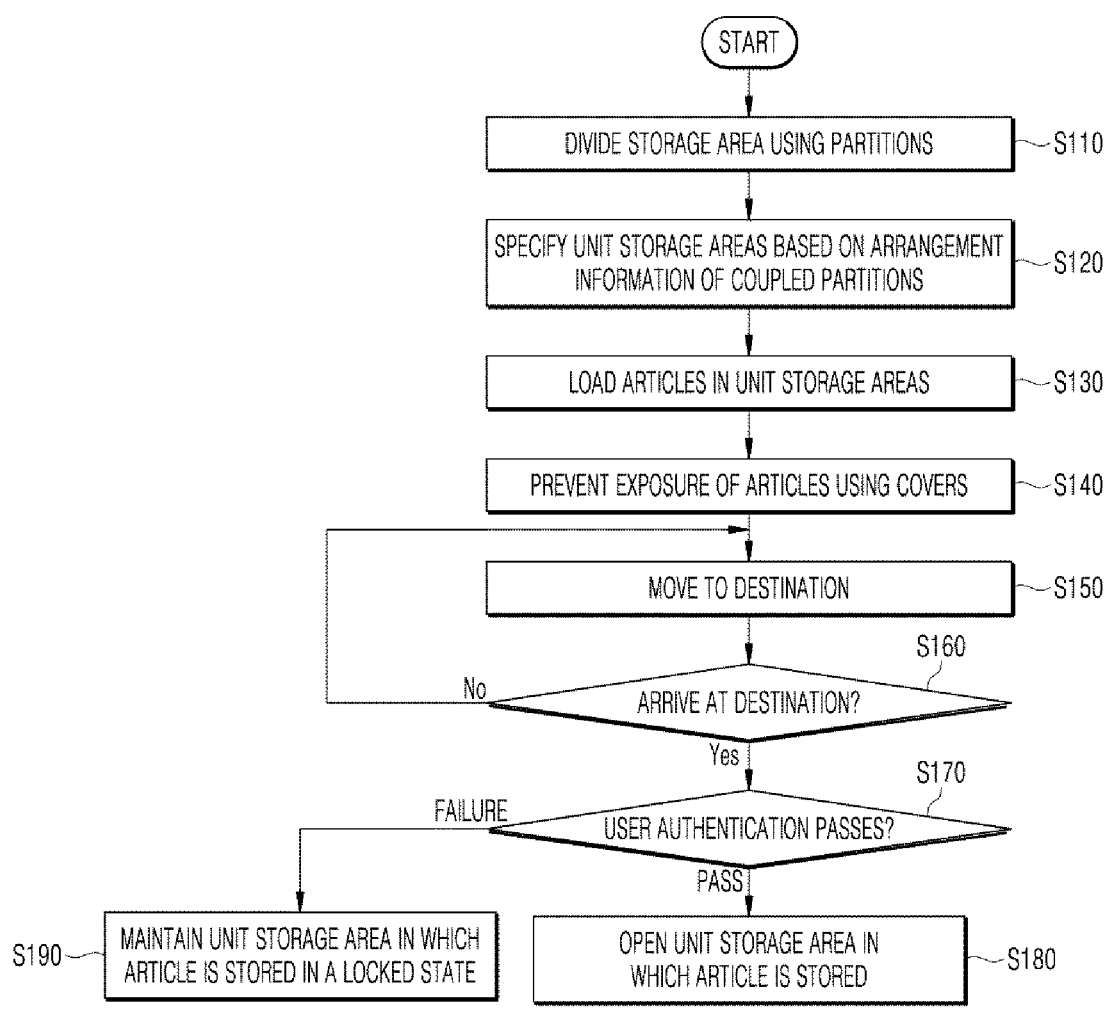
FIG. 11 is a sequence diagram for explaining the operation of the transport robot according to an embodiment of the present disclosure.

FIG. 11 is a sequence diagram for explaining the operation of the transport robot 100 according to an embodiment of the present disclosure. The storage area of the transport robot 100 is divided into one or more unit storage areas by the partitions (S110).

The transport robot 100 specifies unit storage areas based on arrangement information of the coupled partitions (S120). Specifically, based on a coupling sensing signal generated at the coupling portions between the partitions and the storage area, the transport robot 100 may determine at least one of arrangement information of the coupled partitions, arrangement information of the plurality of unit storage areas, or volume information of the plurality of unit storage areas.

Subsequently, when articles are loaded in the unit storage areas (S130), the transport robot 100 prevents exposure of the articles using the covers (S140). The transport robot 100 may open or close the unit storage areas in which the articles are stored only in a situation authorized via the locking device between the covers and the partitions. In such a situation, the transport robot 100 moves to a destination (S150).

The transport robot 100 moves until it arrives at the destination (S150 and S160). Upon arriving at the destination (S160), the transport robot 100 performs user authentication (S170). When the user authentication passes (S170), the transport robot 100 may open the unit storage area in which the article is stored in order to deliver the article to the recipient (S180). When the user authentication fails, the transport robot 100 maintains the unit storage area in which the article is stored in a locked state (S190). In another embodiment, the above-described transport robot 100 may include a storage area without a partition.

The transport robot 100 may include a cover driver and a processor to move one or more covers that are formed of a flexible material and are configured to cover or open the interior of the storage area.

In an alternative embodiment, each of the covers may be formed such that a plurality of plates with a predetermined width are coupled to each other. The plates may be coupled to each other in a hinge engagement manner or in a chain engagement manner.

The cover driver may include a motor corresponding to each of the covers, a rotating shaft connected to the motor, and a roller coupled to the rotating shaft and configured to allow each of the covers to be wound thereon or unwound therefrom via rotational movement of the motor.

That is, the transport robot 100 may manage a single storage area using the plurality of covers. Accordingly, the single storage area may be managed by the plurality of covers as if it were divided into a plurality of unit areas.

In addition, the processor of the transport robot 100 may control the cover driver such that the covers cover or open an exposed area in the storage area.

The present disclosure described above may be embodied as computer-readable codes on a medium on which a program is recorded. The computer-readable medium may include all kinds of recording devices in which computer-readable data is stored. Examples of the computer-readable medium may include a hard disk drive (HDD), a solid state disk (SSD), a silicon disk drive (SDD), a ROM, a RAM, a CD-ROM, a magnetic tape, a floppy disk, and an optical data storage device. Further, the computer may include the processor 190 of the transport robot 100.

An aspect of the present disclosure is to provide a robot in which a storage area for storing articles is capable of being variably partitioned so as to simultaneously transport various kinds of articles depending on the situation. Another aspect of the present disclosure is to provide a robot that loads articles therein and transports the same based on a priority. A further aspect of the present disclosure is to provide a transport robot capable of traveling autonomously.

A transport robot according to an embodiment of the present disclosure may include a structure in which the volume of a storage area for storing articles is capable of being variably divided.

The transport robot may include a body including a storage area, one or more partitions configured to divide the storage area into a plurality of unit storage areas, a cover driver configured to move one or more covers provided to cover or open an exposed area that is exposed to the outside of the body among the plurality of unit storage areas, and a processor configured to determine, based on information detected at a predetermined position of the storage area, at least one of arrangement information of the partitions coupled to the body, arrangement information of the plurality of unit storage areas, or volume information of the plurality of unit storage areas.

Here, the covers may be formed of a flexible material, and the cover driver may include a motor corresponding to each of the covers, a rotating shaft connected to the motor, and a roller coupled to the rotating shaft and configured to allow each of the covers to be wound thereon or unwound therefrom via rotational movement of the motor.

A method of operating a transport robot including a storage area according to an embodiment of the present disclosure may include dividing the storage area into one or more unit storage areas using partitions, determining, based on a coupling sensing signal generated at coupling portions between the partitions and the storage area, at least one of arrangement information of the partitions coupled to the storage area, arrangement information of the unit storage areas, or volume information of the unit storage areas, loading articles in the unit storage areas, covering the unit storage areas in which the articles are loaded using covers, and moving to destinations where the articles are to be delivered.

A transport robot according to an embodiment of the present disclosure may include a body including a storage area, a cover driver configured to move one or more covers that are formed of a flexible material and are provided to cover or open the interior of the storage area, and a processor.

The cover driver may include a motor corresponding to each of the covers, a rotating shaft connected to the motor, and a roller coupled to the rotating shaft and configured to allow each of the covers to be wound thereon or unwound therefrom via rotational movement of the motor.

The processor may control the cover driver such that the covers cover or open an exposed area in the storage area.

As is apparent from the above description, according to various embodiments of the present disclosure, various kinds of articles may be loaded in respective unit storage areas, which are partitioned from each other, depending on delivery priority, thereby enabling efficient storage of articles and safe and accurate delivery of articles to destinations.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present.

As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
 a transceiver to communicate with an external device;
 a body having a storage area;
 a plurality of partitions to divide the storage area into a plurality of unit storage areas;
 a cover driver configured to move one or more covers relative to the plurality of unit storage areas, the covers are configured to cover or open exposed areas of the plurality of unit storage areas;
 a protection structure to couple to the body to protect articles in the storage area and the one or more covers; and
 a processor configured to determine, based on information detected at a predetermined position of the storage area, at least one of arrangement information of the partitions coupled to the body, arrangement information of the plurality of unit storage areas, or volume information of the plurality of unit storage areas,
 wherein the processor is to communicate, through the transceiver to a mobile terminal, the arrangement information of the partitions based on at least one of number information of articles to be loaded in the storage area, weight information of the articles, size information of the articles, delivery order information of the articles, or security level information of the articles,
 wherein the protection structure is configured to rotate about a portion thereof that is coupled to the body to open and close the storage area,
 wherein the protection structure and the body are opened or closed by a locking device, and
 wherein a device for authenticating a user is separately provided in a predetermined region on the protection structure.

2. The robot of claim 1, wherein the covers are made of a flexible material, wherein the cover driver comprises:
 a plurality of motors to separately correspond to a different one of the covers;
 a plurality of rotating shafts to separately rotate based on a corresponding one of the motors; and
 a plurality of rollers to separately wind a corresponding one of the covers on the roller or to separately unwind the corresponding one of the covers from the roller based on rotational movement of the corresponding one of the motors, and
 wherein the processor controls the cover driver such that the covers to cover or open exposed areas of the plurality of unit storage areas.

3. The robot of claim 2, wherein each of the covers to separately move along a cover movement path based on the cover driver,
 wherein the cover movement path comprises an outer movement path exposed to an outside of the body and an inner movement path disposed inside the body; and
 a linear movement guide is provided at the outer movement path to allow at least one of the covers to move linearly along the outer movement path.

4. The robot of claim 2, wherein the plurality of unit storage areas are provided in a single-layer structure and divided in M rows and N columns (where M is a natural number of 1 or more and N is a natural number greater than 1) by the plurality of partitions,
 wherein the one or more covers includes two covers to cover the unit storage areas in a first one of the rows, the two covers including a first cover and a second cover,
 wherein the first cover is to cover the unit storage areas disposed in a first direction from a first column to an Nth column, and the second cover is to cover the unit storage areas disposed in a second direction from the Nth column to the first column, and
 wherein the first cover and the second cover are disposed so as not to overlap each other, and the first cover and the second cover are to be simultaneously coupled to a specific one of the partitions disposed at an intermediate point of the first one of the rows.

5. The robot of claim 4, wherein when the Nth column is an odd-numbered column, the processor controls the cover driver such that the first cover is to cover one more of the unit storage areas than the second cover in the first one of the rows.

6. The robot of claim 4, wherein the processor is to perform control such that articles are to be loaded in the unit storage areas disposed in the first direction such that a security level of the articles in the unit storage areas gradually increases in the first direction.

7. The robot of claim 4, wherein the processor controls the cover driver such that a first specific unit storage area, corresponding to an article to be delivered to a closest destination, is to be opened first among the unit storage areas corresponding to the first cover and the second cover in the first one of the rows.

8. The robot of claim 7, wherein when a second specific unit storage area, corresponding to an article to be delivered to a farthest destination, is to be opened first among the unit storage areas corresponding to the first cover and the second cover in the first one of the rows, the processor is to control the cover driver such that one of the first cover and the second cover moves complementarily so as to prevent exposure of the article at the second specific unit storage area.

9. The robot of claim 2, wherein the one or more covers comprise a plurality of cover coupling portions configured to be coupled to the plurality of partitions,
 wherein the partitions comprise a plurality of partition coupling portions configured to be coupled to the one or more covers, and
 wherein the cover coupling portions of the covers are to couple to the partition coupling portions of the partitions.

10. The robot of claim 9, wherein each of the cover coupling portions comprises an electromagnet,
 wherein each of the partition coupling portions is made of a material that is to magnetically couple to the corresponding electromagnet,
 wherein one of the cover coupling portions or one of the partition coupling portions comprises a cover-partition proximity sensor configured to detect an approach of one of the covers or one of the partitions, and wherein upon the proximity sensor detecting the approach of the one of the covers or the one of the partitions, the processor controls the cover coupling portions such that each of the covers is coupled to a corresponding one of the partitions by applying electric power to the electromagnet.

11. The robot of claim 1, wherein the body includes a partition storage configured to store additional partitions.

12. The robot of claim 1, wherein the processor controls the cover driver so as to open a specific one of the unit storage areas corresponding to a predetermined article based on at least one of security level information of articles in the storage area, delivery order information of the articles, size information of the articles, weight information of the articles, or characteristic information of the articles.

13. The robot of claim 1, further comprising a partition sensor disposed at a coupling portion of the body at which one of the partitions is coupled to the storage area, wherein the processor is configured to determine, based on information detected by the partition sensor, at least one of arrangement information of the partitions coupled to the body, arrangement information of the plurality of unit storage areas, or volume information of the plurality of unit storage areas.

14. The robot of claim 1, comprising a pressure sensor configured to detect pressure distribution of articles in the storage area, wherein when an article is to be loaded in the storage area, the processor controls the cover driver to open a specific one of the unit storage areas in which the article is to be loaded based on pressure distribution information obtained by the pressure sensor.

15. The robot of claim 1, comprising a camera to capture an image of an article, wherein the processor is configured to determine, based on the captured image of the article, at least one of type information of the article, size information of the article, or characteristic information of the article.

16. The robot of claim 15, wherein the camera is to capture an image of a user, and the processor is configured to control the cover driver, based on the captured image of the user, to open a unit storage area of an article to be delivered to the user.

* * * * *